Figure 1:
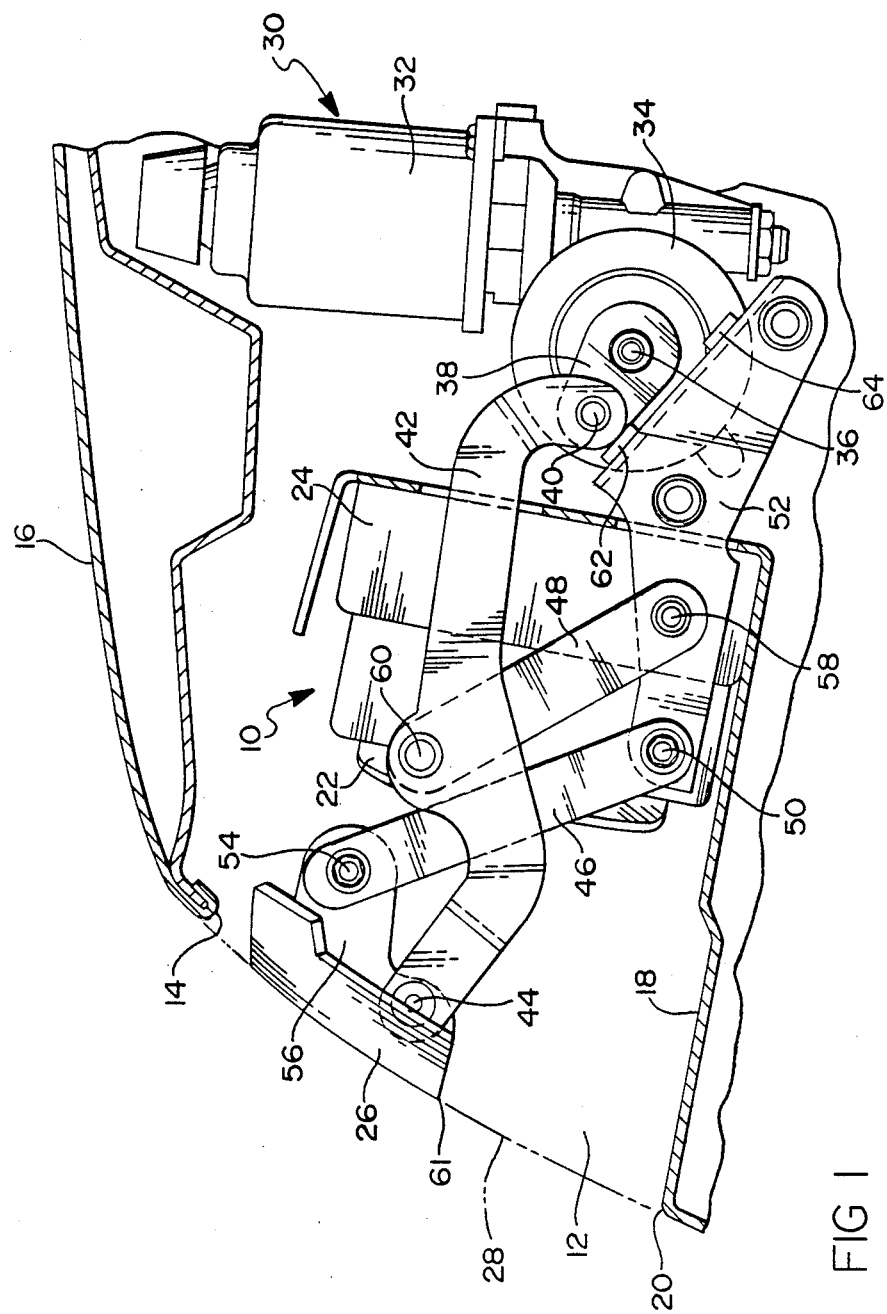

United States Patent [19]
Carrell

[11] Patent Number: 4,947,295
[45] Date of Patent: Aug. 7, 1990

[54] ACTUATOR MECHANISM FOR A HEADLAMP COVER

[75] Inventor: William E. Carrell, Anderson, Ind.

[73] Assignee: General Motors Corporation, Detroit, Mich.

[21] Appl. No.: 461,851

[22] Filed: Jan. 8, 1990

Related U.S. Application Data

[63] Continuation of Ser. No. 319,600, Mar. 6, 1989, abandoned.

[51] Int. Cl.⁵ .............................................. B60Q 1/04
[52] U.S. Cl. ........................................ 362/64; 362/80
[58] Field of Search ................. 362/61, 64, 65, 80, 362/375

[56] References Cited

U.S. PATENT DOCUMENTS

| | | | |
|---|---|---|---|
| 2,347,085 | 4/1944 | Cousino | 362/64 |
| 2,700,725 | 1/1955 | Morphew et al. | 362/64 |
| 3,070,687 | 12/1962 | Marchant | 362/64 |
| 3,522,422 | 8/1970 | Dukatz et al. | 362/64 |
| 4,737,893 | 4/1988 | Horansky | 362/64 |

FOREIGN PATENT DOCUMENTS 3726992  5/1989  Fed. Rep. of Germany .

Primary Examiner—Ira S. Lazarus
Assistant Examiner—Richard R. Cole
Attorney, Agent, or Firm—Edward J. Biskup

[57] ABSTRACT

An actuator mechanism having a linkage connected to a headlamp cover in a manner so that during the initial opening movement of the headlamp cover, the bottom portion of the cover is initially moved inwardly towards the headlamp followed by a translatory upward movement of the headlamp cover and finally a rotation thereof to a raised position so as to expose the headlamp.

4 Claims, 4 Drawing Sheets

ACTUATOR MECHANISM FOR A HEADLAMP COVER

This is a continuation of application Ser. No. 319,600 filed on Mar. 6, 1989, now abandoned.

This invention concerns actuator mechanisms in general and, more particularly concerns an actuator mechanism for moving a vehicle headlamp cover between a lowered position wherein the headlamp is at least partially concealed and a raised position wherein the headlamp is exposed for projecting a beam of light forwardly of the vehicle.

More specifically, the actuator mechanism according to the present invention is located within an opening at the front end of a motor vehicle that has a headlamp mounted therein and positioned to one side of the center longitudinal axis of the vehicle. In the preferred form the actuator mechanism includes an electric motor connected to an output shaft which has a crank rigidly mounted thereon. A linkage connects the crank to a headlamp cover and serves to move the latter between the lowered position and the raised position. The linkage includes a drive link and a pair of guide links. One end of the drive link is connected by a first pivotal connection to the crank and has the other end connected by a second pivotal connection to the lower portion of the headlamp cover. One of the guide links has one end thereof connected by a third pivotal connection to a fixed part of the vehicle and has the other end connected by a fourth pivotal connection to the upper portion of the headlamp cover. The other guide link similarly has one end thereof connected by a fifth pivotal connection to the fixed part of the vehicle but in this instance at a point spaced rearwardly from the third pivotal connection. The other end of the other guide link is connected by a sixth pivotal connection to an intermediate part of the drive link and the arrangement of the crank, drive link, guide links and the pivotal connections is such that when the headlamp cover is in the lowered position and the crank is initially rotated by the electric motor, the lower edge of the headlamp cover is pivoted rearwardly towards the headlamp and, upon continued rotation of the crank the headlamp cover, is translated upwardly and rearwardly towards the headlamp. As the crank continues to rotate, the headlamp cover is rotated about the fourth pivotal connection in a direction opposite to the initial rotation of the lower edge until the headlamp cover assumes the raised position.

The objects of the present invention are to provide a new and improved actuator mechanism for moving a headlamp cover between a lowered position so as to conceal a headlamp and a raised position so as to expose the headlamp; to provide a new and improved actuator mechanism having a linkage connected to a headlamp cover in a manner so that during the opening movement of the headlamp cover the bottom portion of the headlamp cover is initially moved inwardly towards the headlamp and afterwards translated rearwardly and finally rotated upwardly to expose the headlamp; and to provide a new and improved linkage for moving a headlamp cover from a lowered position wherein the headlamp is concealed to a raised position wherein the headlamp is exposed and characterized in that the linkage includes a drive link and a pair of guide links arranged so that when the headlamp cover is in the lowered position the bottom portion of the headlamp cover is initially moved rearwardly towards the headlamp followed by rearward translatory movement of the entire headlamp cover, and finally a rotation of the headlamp cover as it moves to the raised-stored position.

Figure 2:
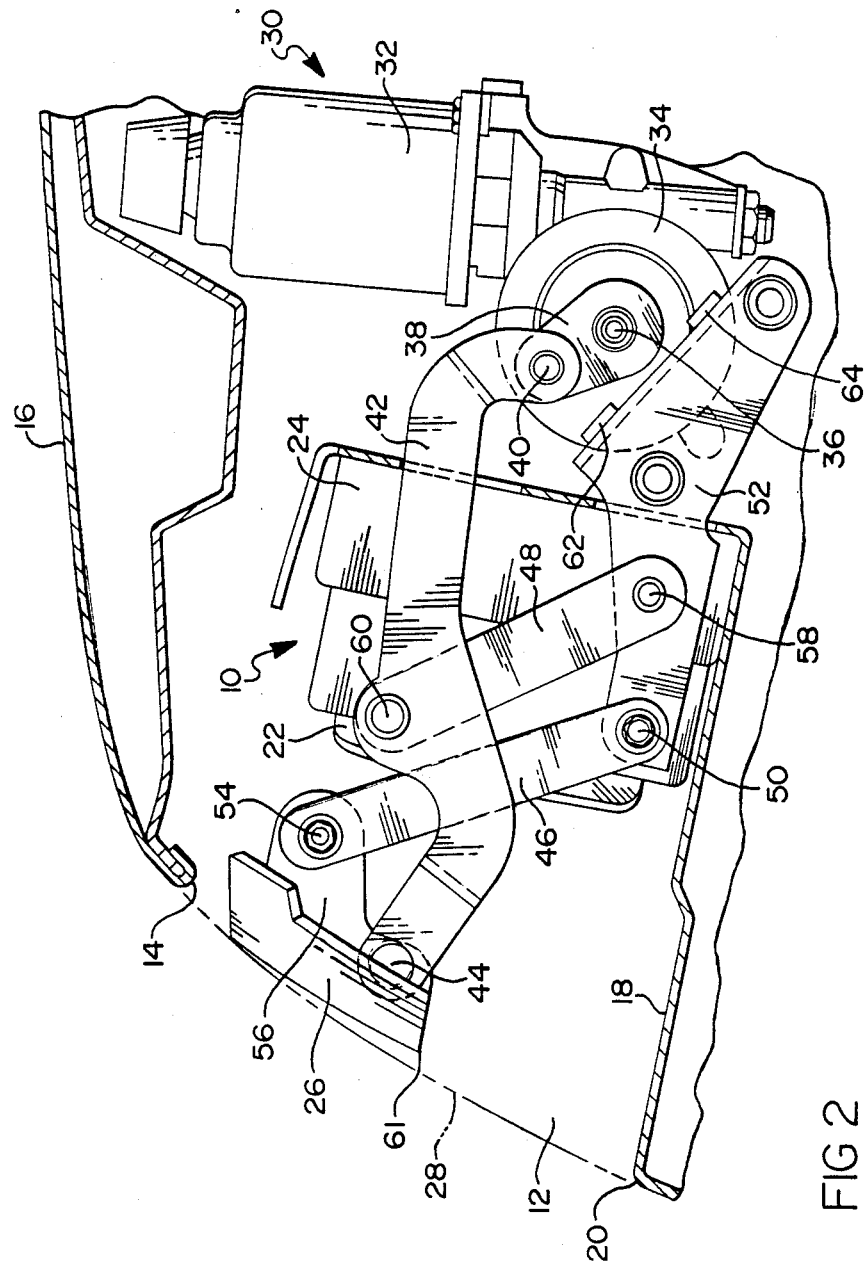
Figure 3:
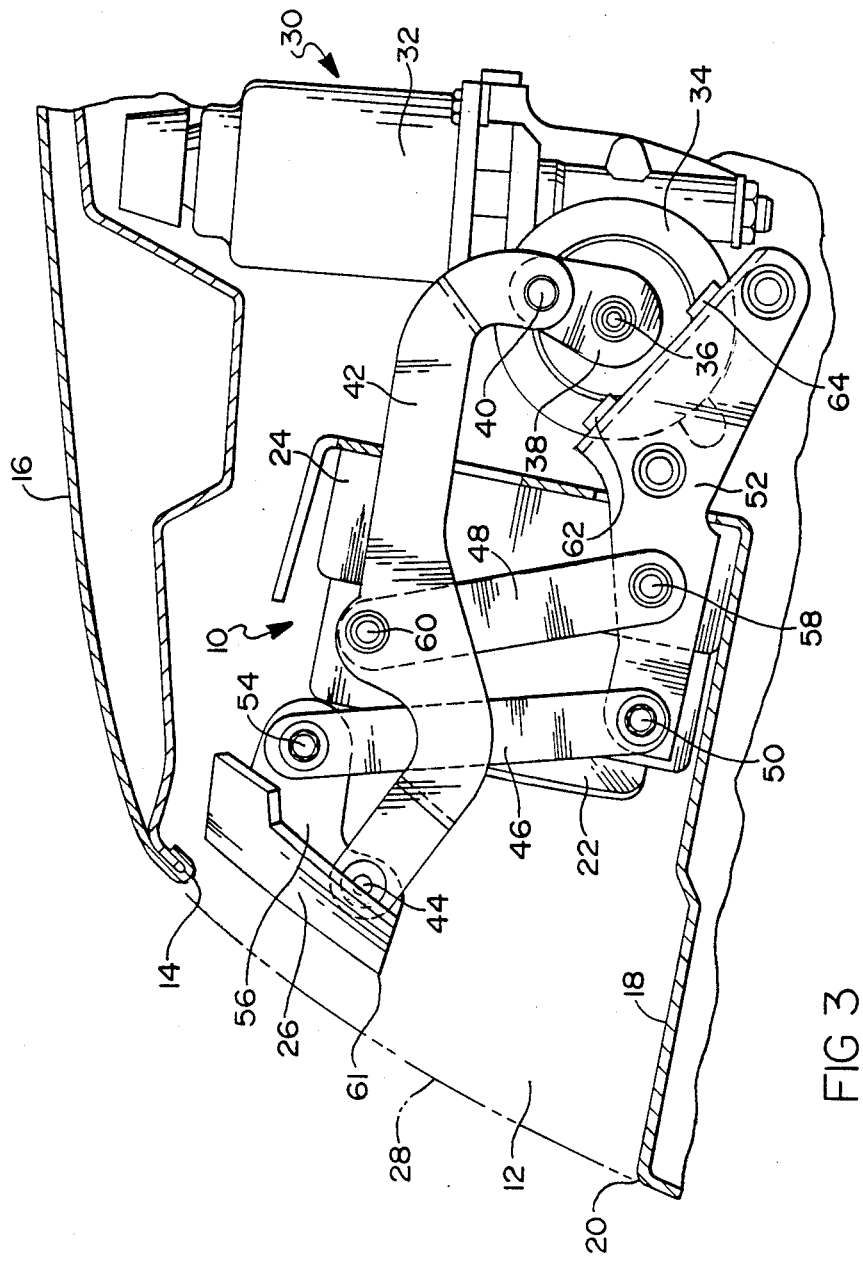
Figure 4:
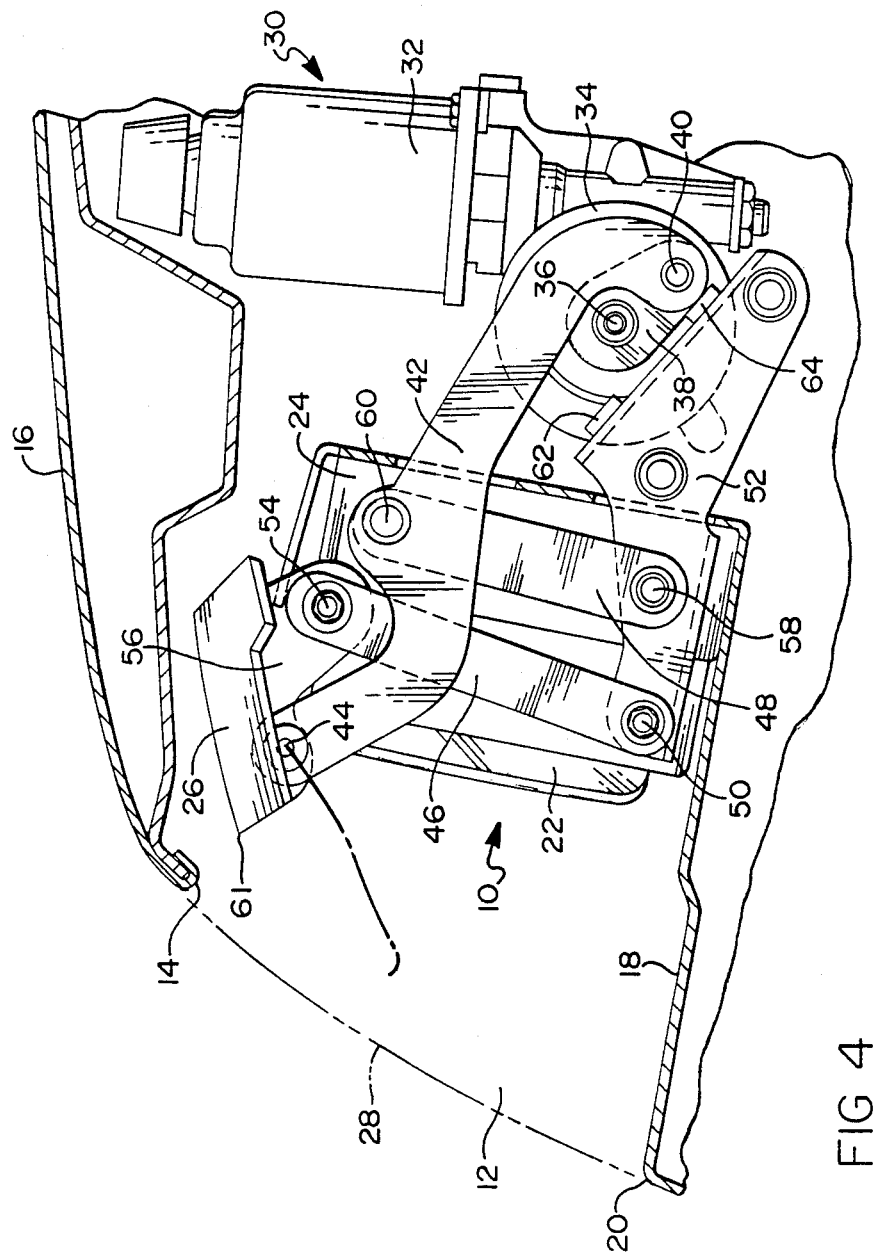

Other objects and advantages of the present invention will be more apparent from the following detailed description when taken with the accompanying drawings in which FIG. 1 is a side elevational view showing the actuator mechanism according to the present invention with the headlamp cover being located in the lowered position;

FIG. 2 is a view similar to that seen in FIG. 1 but shows the position of the headlamp cover and linkage during the initial movement of the linkage of the actuator mechanism;

FIG. 3 is a view similar to that seen in FIG. 1 but shows the position of the headlamp cover and the linkage after the crank connected to the drive motor of the actuator mechanism has moved approximately 90° from its starting position; and FIG. 4 is a view similar to that seen in FIG. 1 but shows the position of the headlamp cover and the linkage when the headlamp cover assumes the raised-stored position.

Referring to the drawings and more particularly to FIG. 1 thereof, a headlamp assembly 10 is shown located within an opening 12 formed at the front end of a motor vehicle. The opening 12 is rectangular in configuration when viewed from the front of the vehicle and is defined by the generally horizontal leading edge 14 of a vehicle hood 16, body side panels (not shown) on opposite sides of the headlamp assembly 10, and a body bottom panel 18 having a horizontal front edge 20. The headlamp assembly 10 includes a headlamp 22 mounted within a support housing 24 which is rigid with the vehicle. The support housing 24 carries the headlamp 22 in a conventional manner for allowing adjustable movement of the headlamp 22 about a horizontal aim axis and a vertical aim axis. In this case, the headlamp opening 12, as seen in FIG. 1, is partially closed by a headlamp cover 26 having an outer configuration which corresponds to the outer shape (indicated by phantom line 28) of the front edge of the body side panels. Also, the headlamp cover 26 is designed to close only the upper one-half of the opening 12 when in the lowered position and, although not shown, is generally rectangular in configuration when viewed from the front of the vehicle. To the rear of the opening 12, an actuator mechanism 30 made in accordance with the present invention, is provided which includes a reversible electric motor 32 indirectly supported in the fixed position shown by the sheer metal of the motor vehicle. The electric motor 32 is drivingly connected to the headlamp cover 26 through a linkage and as will hereinafter be more fully explained, serves to move the headlamp 26 between the lowered position of FIG. 1 and the raised position of FIG. 4. It should be apparent when the headlamp cover 26 is in the lowered position of FIG. 1, the headlamp cover 26 will close the upper one-half of the opening 12 and thereby conceal the upper one-half of the headlamp assembly 10 when the vehicle is viewed from the front. On the other hand when the headlamp cover 26 is in the raised position of FIG. 4, the opening 12 is fully exposed and the headlamp 22 is able to project a light beam forwardly of the vehicle.

Although not shown, the electric motor 32 drives a worm shaft which, in turn, drives a worm gear located in a housing 34. The worm gear is connected to an output shaft 36 which rigidly supports one end of a crank 38 for rotation between the position seen in FIGS. 1 and that seen in FIG. 4. As is conventional with electric lower packs of this type, when the crank 38 reaches each of the positions of FIGS. 1 and 4, electronic limit switch means (not shown) deenergize the motor 32 so that further rotation ⓒf the crank 38 is automatically discontinued.

The free end of the crank 38 is connected by a pivotal connection 40 to the rear end of a drive link 42, the front end of which is connected by a pivotal connection 44 to a lower portion of the headlamp cover 26. The drive link 42 coacts with a pair of guide links 46 and 48 for moving the headlamp cover 26 between the FIG. 1 and FIG. 4 positions and in this regard it will be noted that the guide link 46 has its lower end connected by a pivotal connection 50 to a bracket 52 fixed with the vehicle. The upper end of the guide link 46 is connected by a pivotal connection 54 to a tongue 56 rigidly secured to the rear surface of the headlamp cover 26. Similarly the guide link 48 has its lower end connected by a pivotal connection 58 to the bracket 52 while its upper end is connected by a pivotal connection 60 to an intermediate portion of the drive link 42 at a point to one side of a straight line passing through the centers of pivotal connections 40 and 44.

The arrangement of the drive link 42, guide links 46 and 48 and the crank 38 is such that when the headlamp cover 26 is in the lowered position of FIG. 1 and electric motor 32 is energized, the initial clockwise rotation of the crank 38 causes the lower edge 61 o the headlamp cover 26 to be pivoted counter clockwise about pivotal connection 54 rearwardly as seen in FIG. 2. This initial movement of the lower edge 61 of the headlamp cover 26 permits the latter to clear the aforementioned body side panels in the opposite sides of the headlamp assembly 10. Continued clockwise rotation of the crank 38 then permits the guide links 46 and 48 to move the headlamp cover 26 bodily rearwardly as a unit in a translatory shift to the position seen in FIG. 3. As the crank 38 continues to rotate in a clockwise direction, the lower edge 61 of the headlamp cover 26 pivots in a clockwise direction about the pivotal connection 54 and moves to the fully raised position of FIG. 4 at which time the electric motor 32 is automatically deenergized. It will be noted that when rotating from the fully lowered position of FIG. 1 to the fully raised position of FIG. 4 the crank 38 rotates approximately 190° between a pair of limit stops 62 and 64 carried by the bracket 52. Also, the counter clockwise pivoting of the lower edge 61 as seen in FIG. 2 occurs during the first 20° of rotation of the crank 38 as it moves from the position of FIG. 1 to FIG. 2. The translatory movement of the headlamp cover 26 between the position of FIGS. 2 and 3 occurs between the 20° position and the 90° position of the crank 38 and finally the rotational movement of the headlamp cover 26 between the positions of FIGS. 3 and 4 occurs as the crank 38 rotates (rom the 90° position to the final position of FIG. 4. In addition, during the opening movement of the headlamp cover 26 between the positions shown in FIGS. 1 and 4 the center of the pivotal connection 44 travels along the J-shaped path seen in FIG. 4.

As should be apparent from the above description, once the headlamp cover 26 assumes the fully raised position of FIG. 4, the electric motor 38 is deenergized as aforementioned. Also, it should be apparent, that the energization of the electric motor 32 will normally occur when the headlamp switch is activated so as to energize the headlamp 22. When the headlamp switch is moved so as to deenergize the headlamp 22 the electric motor 32 will again be energized to cause the crank 38 to rotate in a counter clockwise direction so as to cause the headlamp cover 26 to move from the raised position of FIG. 4 to the lowered position of FIG. 1.

Various changes and modifications can be made in this construction without departing from the spirit of the invention. Such changes and modifications are contemplate by the inventor and he does not wish to be limited except by the scope of the appended claims.

The embodiments of the invention in which an exclusive property privilege is claimed are defined as follows:

1. In combination with the front end of a vehicle having an opening in which a headlamp is located in a fixed position for projecting a beam of light forwardly of the vehicle, a headlamp cover located in said opening and movable between a lowered position wherein the headlamp is concealed and a raised position wherein the headlamp is exposed for projecting said beam of light forwardly of said vehicle, an actuator mechanism carried by said vehicle for moving said headlamp cover between said lowered position and said raised position, said actuator mechanism including a motor connected to an output shaft, a crank rigidly mounted on said output shaft for rotation therewith and a linkage connected between said headlamp cover and said crank so that upon initial rotation of said crank when said headlamp cover is in said lowered position the lower edge of the headlamp cover is pivoted rearwardly towards the headlamp and upon continued rotation of the crank the headlamp cover is translated upwardly and rearwardly towards the headlamp followed by a rotation of the headlamp cover so as to position said headlamp cover above said headlamp.

2. In combination with the front end of a vehicle having an opening in which a headlamp is located in a fixed position for projecting a beam of light forwardly of the vehicle, a headlamp cover located in said opening and movable between a lowered position wherein the headlamp is concealed and a raised position wherein the headlamp is exposed for projecting said beam of light forwardly of said vehicle, an actuator mechanism carried by said vehicle for moving said headlamp cover between said lowered position and said raised position, said actuator mechanism including a motor connected to an output shaft, a crank rigidly mounted on said output shaft for rotation therewith, a linkage connecting said crank to said headlamp cover and serving to move the latter between said lowered position and said raised position, said linkage including a drive link, a first guide link and a second guide link, one end of said drive link being connected by a first pivotal connection to said crank and having the other end connected by a second pivotal connection to said headlamp cover, said first guide link having one end thereof connected by a third pivotal connection to a fixed part of said vehicle and having the other end thereof connected by a fourth pivotal connection to said headlamp cover, said second guide link having one end thereof connected by a fifth pivotal connection to said fixed part of said vehicle at a point spaced rearwardly from said third pivotal connection and having the other end thereof connected by a sixth pivotal connection to said drive link at point intermediate of said first pivotal connection and said second pivotal connection the arrangement of said crank, said drive link and said first and second guide links being such when said headlamp cover is in lowered position and said crank is initially rotated by said motor the lower edge of said headlamp cover is pivoted about said fourth pivotal connection rearwardly towards the headlamp and upon contInued rotation of said crank the headlamp cover is translated upwardly and rearwardly towards the headlamp followed by an upward rotation of said lower edge of said headlamp cover about said fourth pivotal connection in a direction opposite to said initial rotation of said lower edge as said headlamp cover assumes said raised position.

3. In combination with the front end of a vehicle having an opening in which a headlamp is located in a fixed position for projecting a beam of light forwardly of the vehicle, said opening being rectangular in configuration and being defined by upper and lower body panels and a pair of laterally spaced side body panels, a headlamp cover located in said opening and movable between a lowered position wherein the uPper portion of the headlamp is concealed and a raIsed posItion wherein the headlamp is fully exposed for projecting said beam of light forwardly of said vehicle an actuator mechanism carried by said vehicle for moving said headlamp cover between said lowered position and said raised position, said actuator mechanism including an electric motor connected to an output shaft, a crank rigidly mounted on said output shaft for rotation therewith, a linkage located alongside said headlamp, said linkage connecting said crank to said headlamp cover and serving to move the latter between said lowered position and said raised position, said linkage including a drive link, a first guide link and a second guide link, one end of said drive link being connected by a first pivotal connection to said crank and having the other end connected by a second pivotal connection to the lower portion of said headlamp cover, said firs: guide link having one end thereof connected by a third pivotal connection to a fixed part of said vehicle and having the other end thereof connected by a fourth pivotal connection to the upper portion of said headlamp cover, said second guide link having one end thereof connected by a fifth pivotal connection to said fixed part of said vehicle at a point spaced rearwardly from said third pivotal connection and having the other end thereof connected by a sixth pivotal connection to said drive link at point intermediate of said first pivotal connection and said second pivotal connection, the arrangement of said crank said drive link and said first and second guide links being such when said headlamp cover is in lowered position and said crank is initially rotated by said motor the lower edge of said headlamp cover is pivoted about said fourth pivotal connection rearwardly towards the headlamp and upon continued rotation of said crank the headlamp cover is translated upwardly and rearwardly towards the headlamp followed by an upward rotation of said lower edge of said headlamp cover about said fourth pivotal connection in a direction opposite to said initial rotation of said lower edge as said headlamp cover assumes said raised position.

4. In combination with the front end of a vehicle having an opening in which a headlamp is located in a fixed position for projecting a beam of light forwardly of the vehicle, a headlamp cover located in said opening and movable between a lowered position wherein the headlamp is concealed and a raised position wherein the headlamp is exposed for projecting said beam of light forwardly of said vehicle, an actuator mechanism carried by said vehicle for moving said headlamp cover between said lowered position and said raised position, said actuator mechanism including a motor connected to a movable output shaft, means rigidly mounted on said output shaft for movement therewith, and a linkage connected between said headlamp cover and said means so that upon initial movement of said means when said headlamp cover is in said lowered position the lower edge of the headlamp cover is pivoted rearwardly towards the headlamp and upon continued movement of the means the headlamp cover is translated upwardly and rearwardly towards the headlamp followed by a rotation of the headlamp cover so as to position said headlamp cover above said headlamp.

* * * * *